(No Model.)
J. MAGGI.
CAPSULED CONDENSED FOOD.
No. 428,502. Patented May 20, 1890.
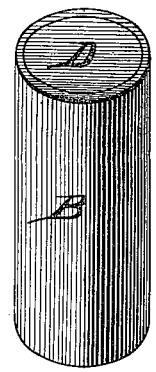
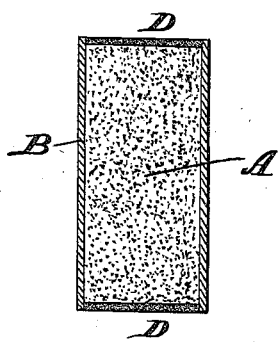
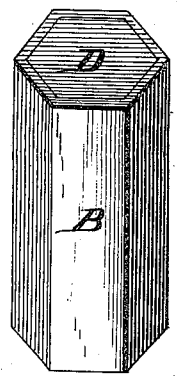
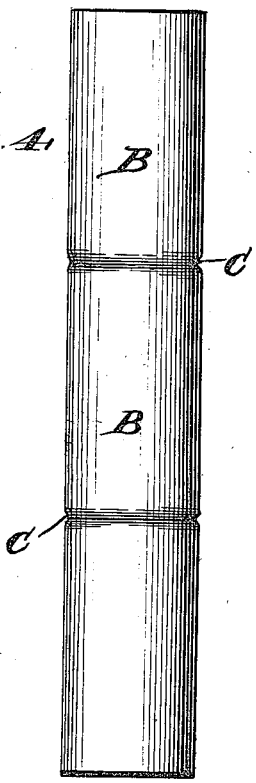
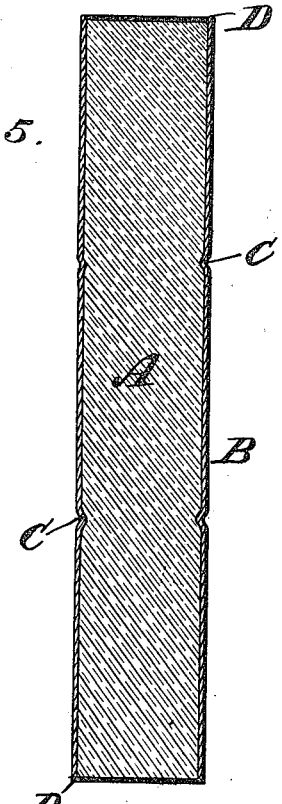
WITNESSES:
F. L. Durand
Wm. F. Folks
INVENTOR:
Julius Maggi,
by Louis Bagger & Co.
his Attorneys.

UNITED STATES PATENT OFFICE.

JULIUS MAGGI, OF KEMPTTHAL, SWITZERLAND.

CAPSULED CONDENSED FOOD.

SPECIFICATION forming part of Letters Patent No. 428,502, dated May 20, 1890.

Application filed January 20, 1890. Serial No. 337,507. (No specimens.)

*To all whom it may concern:*

Be it known that I, JULIUS MAGGI, a citizen of the Republic of Switzerland, residing at Kemptthal, Switzerland, have invented certain new and useful Improvements in Condensed Foods, of which the following is a specification.

This invention relates to the manufacture, as an improved article of merchandise, of prepared solid food products or compounds in a condensed form, and has for its object to produce the article in a compact and convenient form, especially adapted for the instantaneous use of travelers, housekeepers, or army and navy use, where it is of importance that the food should occupy as little space as possible, and also be in such a form and condition that it may be made ready for consumption with but little preparation.

With this object in view my improvement consists in the peculiar form of condensed food or alimentary products as an article of manufacture, which will be hereinafter more fully described and claimed.

In the accompanying drawings, Figure 1 is a perspective view of one of the "portions" of my improved condensed food. Fig. 2 is a longitudinal sectional view of the same. Fig. 3 is an illustration in perspective of a slightly-modified form of the article. Fig. 4 is a side view of a soluble tube constituting with its soluble contents a number of portions, and Fig. 5 is a longitudinal sectional view of the same.

Like letters of reference denote corresponding parts in all the figures.

In carrying out my improvement I take any prepared-food compound—such as condensed and desiccated or pulverized meat, fish, or vegetables, or a mixture of these—and bring the same to a plastic state by the addition of a suitable quantity of water, bouillon, or some other suitable fluid. This paste (shown at A) is then pressed into tubes B, of gelatine, gum-tragacanth, or some other suitable edible and soluble material and the ends of the tubes sealed with soluble wafers containing a condiment adapted to flavor the contents of the tube when dissolved therewith. The filled tubes (which may be of any desired length and thickness) are then dried by a slow heat, after which the article is ready to be packed in boxes for shipment and sale.

To use this article in the preparation of soup, for example, all that is necessary is to break or cut off a piece or section of suitable length, according to the size of the portion, and put the same into a pot of boiling water. In order that the proper quantity in a given case may be readily estimated, it is convenient to mark the outside of the long tube B with lines or indentations, as shown at C, the length of tube or section between two of these marks being sufficient for an ordinary portion. This enables a person at a glance to break or cut off precisely the correct quantity for any given number of persons, and by indenting these marks C, as illustrated in Fig. 5, the tube may be readily broken at the proper places.

Instead of filling long tubes with the prepared-food compound, this may be confined within shorter tubes, each sufficient for a single person or portion only, and these may be either cylindrical in shape, as in Fig. 1, or polygonal, as in Fig. 3, the last-named (hexagonal) shape permitting of the portions being packed closely together, so as to economize space. Again, instead of filling these soluble and edible tubes with prepared-food compound in a plastic state and then solidifying the same by drying, this compound or composition A may be placed in the soluble inclosures in the form of a dry compressed powder, the open ends of the tube being sealed with a thin wafer of a seasoning-paste made of pepper, cayenne, or some other pungent condiment, which answers the threefold purposes of seasoning the soup, closing the open ends of the tube, and resisting by its pungency the attacks of ants and other injurious insects. This sealing-wafer (shown at D) will when dry and hard confine the food composition within the tube.

I am well aware that it is not new to administer medicine in a powdered or fluid form in capsules made of gelatine or some other soluble and innocuous substance, and I do not therefore broadly claim inclosures of gelatine or other soluble and edible material; but I am not aware that condensed and prepared food has ever been confined in the manner described by me in open tubes sealed at the ends with a wafer of some pungent material, which not only forms an important though small ingredient of the article, but also by its character affords a certain protection against the deleterious attacks of ants and other vermin, especially on shipboard or in hot climates.

Having thus described my invention, I claim and desire to secure by Letters Patent of the United States—

As an improved article of manufacture, a prepared food comprising a suitable quantity of alimentary material in a condensed form confined within tubes of a soluble and edible substance, said tubes being sealed with soluble wafers containing a pungent condiment adapted to flavor the contents of the tube when dissolved therewith, substantially as set forth.

In testimony whereof I hereunto sign my name, in the presence of two subscribing witnesses, this 9th day of November, 1889.

JULIUS MAGGI.

Witnesses:
 EMIL BLUM.
 A. LEEMONNY.